United States Patent [19]

Shore et al.

[11] 4,388,284
[45] Jun. 14, 1983

[54] DRY PROCESS FOR PRODUCING DIBORANE

[75] Inventors: Sheldon G. Shore, Columbus; Mark A. Toft, Amlin, both of Ohio

[73] Assignee: The Ohio State University Research Foundation, Columbus, Ohio

[21] Appl. No.: 303,387

[22] Filed: Sep. 18, 1981

[51] Int. Cl.³ .............................................. C01B 6/10
[52] U.S. Cl. ..................................................... 423/295
[58] Field of Search ................................ 423/276, 295

[56] References Cited

U.S. PATENT DOCUMENTS 2,543,511  2/1951  Sehlesinger ........................ 423/295
2,888,327  5/1959  Adams ................................ 423/295

FOREIGN PATENT DOCUMENTS 836184  6/1960  United Kingdom ................ 423/235

Primary Examiner—O. R. Vertiz
Assistant Examiner—Jackson Leeds
Attorney, Agent, or Firm—Millard & Cox

[57] ABSTRACT

Diborane is produced by reacting lithium or sodium borohydride with boron trifluoride in the absence of a solvent, thereby avoiding the dangers associated with the ether solvents previously used in similar reactions. The reaction appears to proceed via hydride abstraction from the borohydride, rather than via the hydride-halide exchange mechanism in the corresponding reaction in ether solution. Yields of about 95% can be achieved.

11 Claims, No Drawings

DRY PROCESS FOR PRODUCING DIBORANE

This invention was made with funds from the U.S. Army, grant number DAAG 29-81-C-0029.

BACKGROUND OF THE INVENTION

This invention relates to a process for producing diborane.

Diborane ($B_2H_6$) is a known compound which is manufactured commercially for a number of uses. A massive amount of research has been carried out into methods for its synthesis, as shown in the following review articles:

I. R. T. Holzman, "Production of the Boranes and Related Research", Academic Press (1967), Chapter III;

II. R. M. Adams, "Boron, Metallo-Boron Compounds and Boranes", Interscience Publishers (1964), pages 559–571, plus list of references on Pages 670–690; and III. R. M. Adams, "Preparation of Diborane", in "Borax to Boranes", Advances in Chemistry Series No. 32, Americal Chemical Society (1961), Pages 60–68.

Of the numerous possible methods for producing diborane described in the above review articles, one type of reaction which proceeds almost quantitatively and which is used commercially to produce diborane is the reaction of an alkali metal borohydride with boron trifluoride in the presence of a solvent, the solvent normally being an ether. Although as stated above, this reaction does proceed almost quantitatively, it has the very serious disadvantage of using the highly inflammable ether solvent, which may vary from diethyl ether to polyethers such as diglyme. Although those skilled in the art of chemical engineering are of course familiar with safety precautions necessary to work with highly inflammable ether solutions on an industrial scale, the need for a highly inflammable solvent in a diborane-producing reaction is especially disadvantageous because diborane itself is spontaneously inflammable in air. Thus, the slightest leak of diborane from the closed vessel in which it is produced into the atmosphere carries the risk that the resultant spontaneous ignition of the leaking diborane will cause a fire which will spread to the large quantities of highly volatile, highly inflammable ether solvent being used. The extreme safety precautions necessary to avoid the potentially catastrophic consequences of a minor leak of diborane when that compound is being produced on an industrial scale are a significant factor in the high cost of diborane; even when purchased in ton quantities, diborane costs in excess of $200 per pound ($420 per kilogram). Furthermore, the cost of the ether solvent itself is a major factor in the cost of diborane, since the polyethers such as diglyme which are preferred for ease of separation of the diborane therefrom are expensive.

Accordingly, there has long been a need in the art for a process for producing diborane which does not involve the use of inflammable solvents. However, those skilled in the art have hitherto believed that it is not possible to react alkali metal borohydrides with boron trihalides except in the presence of a solvent. Extensive investigations of the mechanism of the reaction between alkali metal borohydrides and boron trihalides have shown that the yields are controlled by kinetic rather than thermodynamic factors and that the solubilities of the reaction in a single phase are critical. Furthermore, it has been shown that in such a reaction the boron trihalide reacts in the form of an etherate complex and that the formation of diborane is preceded by an intermediate stage in which one or more alkoxy groups derived from the ether become attached to the boron (see Reference I above, Pages 35–36 and Reference II above, Pages 563–564). In other words, the ether is acting not merely as a solvent but also as an essential reagent in the formation of an alkoxyborane which is formed as an intermediate prior to the production of diborane itself. Accordingly, those skilled in the art have hitherto had every reason to believe that it is not possible to react alkali metal borohydrides with boron trihalides in the absence of a solvent and have been compelled to continue using the hazardous "wet" processes with the expensive ether solvents.

SUMMARY OF THE INVENTION

The invention provides a "dry" process for producing diborane comprising reacting lithium or sodium borohydride with boron trifluoride in the absence of a solvent.

The dry process of the invention avoids the expense of the ether solvents used in prior art processes and also avoids the cost of separating the diborane product from the ether solvent.

The preferred borohydride for use in the instant process is sodium borohydride. The reaction is conveniently carried out under a pressure of about one to six atmospheres and a temperature of about 0° to about 50° C.; thus the reaction may be carried out at ambient temperature. In the instant process, the boron trifluoride may be brought into contact with the lithium or sodium borohydride while the boron trifluoride is in the liquid state (boron trifluoride boils at −101° C. under atmospheric pressure, so that it can easily be condensed on to the borohydride using liquid nitrogen) and the resultant mixture allowed to warm to the reaction temperature. Alternately, gaseous boron trifluoride may be pumped into a vessel containing the solid borohydride. The reaction period is conveniently from 4 to 12 hours.

It will be apparent to those skilled in the art that the mechanism of the instant dry reaction must be completely different from the mechanism of the same reaction in solution in ether. We believe (although the invention is in no way limited by this belief) that the instant "dry" reaction is essentially a hydride abstraction from the $BH^-_4$ ion to give $BH_3$ units which dimerize to form $B_2H_6$, in contrast to the hydride/halide exchange in ether solvent.

The following examples are now given, though by way of illustration only to show details of preferred processes of the invention.

EXAMPLE 1

0.9840 g of sodium borohydride (26.3 mmoles) was placed in a 100 cm³ pyrex reaction vessel equipped with a 15 mm Fisher-Porter solv-seal joint in the place of the standard tapered joint. A vacuum line stopcock adapter was then attached to the reaction vessel (this adapter consisting of a 0-4 mm polytetrafluoroethylene stopcock having a 15 mm. solv-seal joint on one side and a standard taper 14/35 outer joint on the other side). The reaction vessel was then evacuated by means of the stopcock adapter using a standard vacuum line equipped with a rotary rough pump and a mercury diffusion pump. After evacuation the reaction vessel was cooled to −196° C. with liquid nitrogen and 26.3 mmoles (measured by gas volume in a calibrated system) of boron trifluoride were condensed onto the solid sodium borohydride. After all the boron trifluoride had been added, the apparatus was warmed to room temperature and the reactants vigorously mixed by means of a polytetrafluoroethylene-coated stir bar and a magnetic stirring plate. The volatile constituents present (14.0 mmoles) were examined after 4–5 hours by examination by the gas-phase infrared spectrum at 45 Torr; this spectrum showed the volatile material to consist mainly of diborane with traces of boron trifluoride. Recondensation of the volatile materials back into the reaction vessel and additional stirring for eight further hours produced an infrared spectrum showing almost no trace of boron trifluoride but consisting substantially of diborane. The yield of diborone was 13.0 mmoles (approximately 95%).

The solid residue remaining in the reaction vessel comprised a mixture of three molar parts of sodium tetrafluoroborate and one molar part of sodium borohydride, as shown by the $^{11}$B nuclear magnetic resonance spectrum in 0.1 M aqueous sodium hydroxide at room temperature.

EXAMPLE 2

The procedure followed in Example 1 was repeated except that 0.3423 g. of sodium borohydride (9.05 mmoles) was reacted with 12.1 mmoles of boron trifluoride. After 4–5 hours reaction, the volatile constituents of the reaction mixture, totalling 6.5 mmoles, consisted primarily of diborane with some boron trifluoride. After 24 hours total reaction time, the volatile constituents of the reaction mixture, totalling 5.75 mmoles, comprised about 96% diborane, with only slight traces of boron trifluoride (as shown by infrared spectroscopy). The solid residue remaining in the reaction vessel consisted exclusively of sodium tetrafluoroborate as shown by $^{11}$B nuclear magnetic resonance in 0.1 M aqueous sodium hydroxide at room temperature.

Reaction of lithium borohydride with boron trifluoride under the same conditions as in Examples 1 and 2 gave diborane in 65% yield after three hours reaction time.

Since, in the prior art wet processes, sodium borohydride reacts with both boron trifluoride and boron trichloride in a similar manner though at different rates, it might be supposed that sodium borohydride and boron trichloride could be used in the instant process to yield diborane. Indeed, Reference III above, page 62 alleges that sodium borohydride and boron trichloride will yield diborane when stirred in a glass ball mill, but the only authority given for this statement is a personal communication and no physical evidence is stated to support the theory that the product is indeed diborane. We have made several attempts to carry out the reaction of sodium borohydride and boron trichloride under the same conditions as in Examples 1 and 2. However, infrared analysis of the volatile constituents of such a reaction mixture has failed to indicate any diborane. Even after a total reaction time of 48 hours, infrared spectroscopy indicates that 95% of the volatile constituents of the reaction mixture is unchanged boron trichloride, together with traces of chloroboranes; the infrared spectrum shows no trace of diborane.

It will be apparent to those skilled in the art that numerous changes and modifications can be made in the preferred embodiments of the invention just described. Accordingly, the foregoing description is to be construed in an illustrative and not a limitative sense, the scope of the invention being defined solely by the appended claims.

We claim:

1. A process for producing diborane comprising reacting lithium or sodium borohydride with boron trifluoride in the absence of a solvent at a reaction temperature of about 0° C. to about 50° C., said lithium or sodium borohydride and said boron trifluoride being present in a molar ratio of about 1:1 to about 3:4 and said reaction being conducted by bringing said boron trifluoride into contact with said lithium or sodium borohydride while said boron trifluoride is in the liquid state and the resultant mixture is allowed to warm to said reaction temperature.

2. A process according to claim 1 wherein said borohydride is sodium borohydride.

3. A process according to claim 1 wherein said reaction is carried out under a pressure of about 1 to about 6 atmospheres.

4. A process according to claim 1 wherein said reaction is carried out at about ambient temperatures.

5. A process according to claim 1 wherein said reaction is carried out for a period of about 4 to about 12 hours.

6. A process according to claim 1 wherein said borohydride is sodium borohydride and the molar ratio of said sodium borohydride to said boron trifluoride is about 3:4.

7. A process according to claim 1 wherein said lithium or sodium borohydride is cooled to about the temperature of liquid nitrogen while said boron trifluoride is brought into contact with said lithium or sodium borohydride.

8. A process according to claim 7 wherein, after said boron trifluoride is brought into contact with said lithium or sodium borohydride, the resultant mixture is allowed to warm to about ambient temperature and said reaction to proceed at about ambient temperature with stirring for a period of at least about 12 hours.

9. A process for producing diborane comprising reacting lithium or sodium borohydride with boron trifluoride in the absence of a solvent at a reaction temperature of about 0° C. to about 50° C., said lithium or sodium borohydride and said boron trifluoride being present in a molar ratio of about 1:1 to 3:4 and said reaction being conducted by pumping said boron trifluoride in gaseous form into a vessel containing said lithium or sodium borohydride in solid form.

10. A process according to claim 9 wherein said borohydride is sodium borohydride and the molar ratio of said sodium borohydride to said boron trifluoride is about 3:4.

11. A process according to claim 10 wherein said boron trifluoride is pumped into said vessel at about room temperature while sodium borohydride is stirred and said reaction thereafter proceeds at about room temperature.

* * * * *